July 7, 1970　　　　J. F. LA VAN ETAL　　　　3,519,729
ELECTRICAL JUNCTION
Filed Sept. 25, 1967　　　　　　　　　　　　2 Sheets-Sheet 1
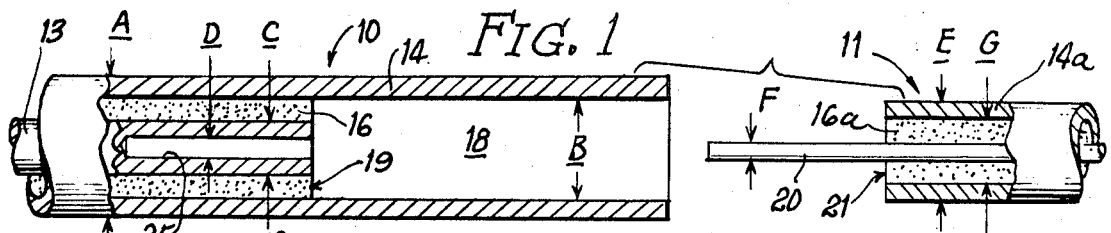
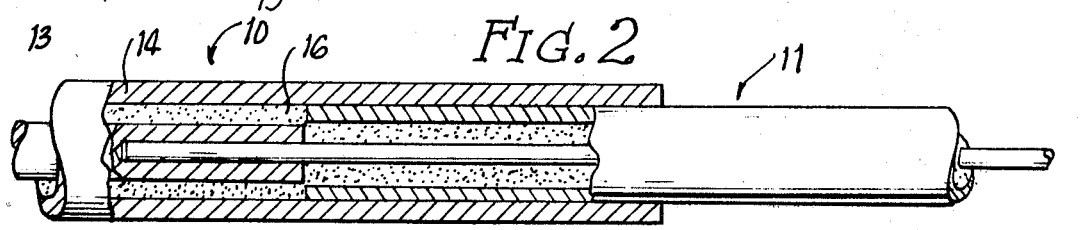
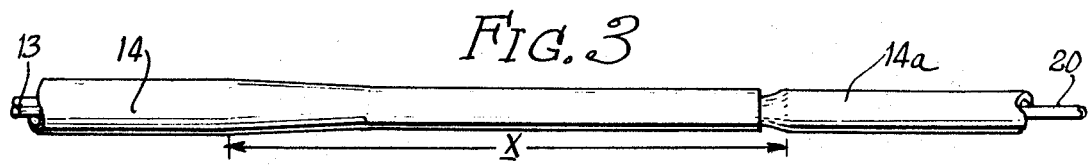
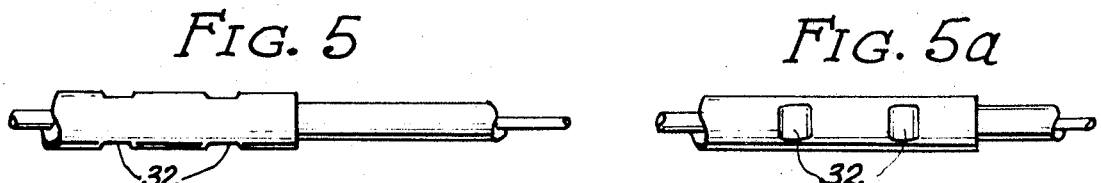
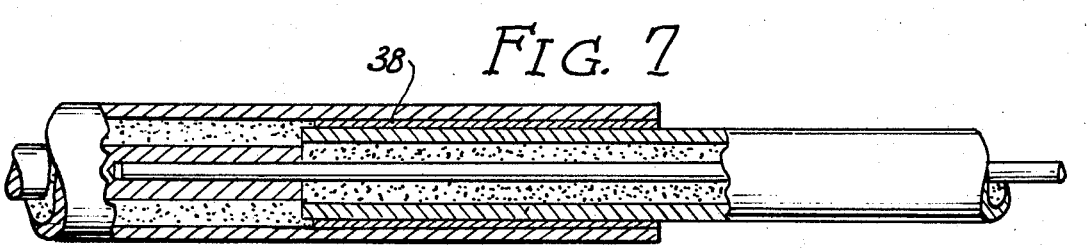
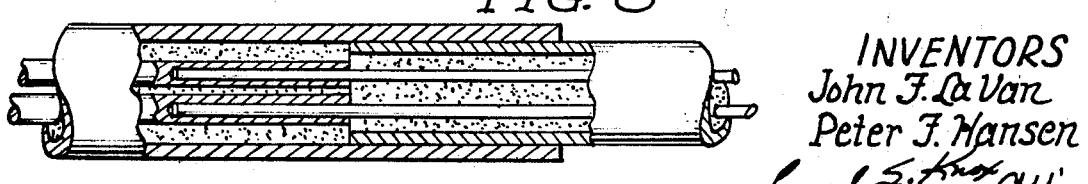
INVENTORS
John F. La Van
Peter F. Hansen
Leonard S. Knox Att'y July 7, 1970   J. F. LA VAN ETAL   3,519,729
ELECTRICAL JUNCTION Filed Sept. 25, 1967

INVENTORS
John J. La Van
Peter F. Hansen
Leonard S. Knox
Atty

United States Patent Office 3,519,729
Patented July 7, 1970

3,519,729
ELECTRICAL JUNCTION
John F. La Van, Oak Park, and Peter F. Hansen, Niles, Ill., assignors to American Standard Inc., New York, N.Y., a corporation of Delaware
Filed Sept. 25, 1967, Ser. No. 670,083
Int. Cl. H02g 15/08
U.S. Cl. 174—88
7 Claims

ABSTRACT OF THE DISCLOSURE

Means for connecting two components in the nature of coaxial conductors, each comprising an outer sheath and an inner conductor with a dielectric therebetween. The inner conductor of one component is bored to receive the inner conductor of the other component. The sheath of the one component extends beyond the end of its inner conductor and dielectric to define a pocket receiving the sheath of the other component, permitting telescoping engagement of the sheaths. The inner conductor of the other component extends beyond its sheath and dielectric so that it may intromit the bore of the other inner conductor when the sheaths are in telescoped relation. The joints as thus constituted are desirably rendered mechanically reliable and hermetically sealed by swaging or crimping in the region of the joints.

---

This invention relates to electrical junctions. In particular it has reference to a junction between two coaxial conductors which utilizes the conductors per se as contrasted with one employing an intermediate device to which the members of the conductors are secured. The invention has a preferred field of use in splicing miniature or sub-miniature coaxial conductors.

For example, one of the components may comprise a centrally-located conductor or a group thereof surrounded by a tubular metallic sheath together with a dielectric which serves to electrically insolate the sheath and the conductor or conductors and to maintain the predetermined spacing thereof. The dielectric may also have the characteristics of a refractory, such as a compacted mass of pulverulent magnesium oxide, a string of ceramic beads, or other well-known expedient. The component as thus constituted is to be connected to a coaxial cable for connection to a source of current.

In this, and similar types of junctions certain desiderata are presented, among which are: (1) The junction must be hermetic, (2) it must have minimum electrical resistance, (3) such resistance must not be allowed to vary beyond established tolerances notwithstanding movement to which the junction may be subjected during installation and use, such as may occur in the presence of vibration or shock, (4) the junction must be adaptable to a range of cryogenic temperatures or of high temperatures, (5) the junction must be proof against change in its characteristics in the presence of radiation, e.g. neutron radiation, (6) it must not require potting, heat sinks or the application of heat as part of its fabrication and (7) must be capable of pre-fabrication utilizing predetermined lengths of the two components being connected, thereby relieving the end user of fabricating a joint embodying the principles of the invention and testing the same in the field whereat suitable facilities and/or the requisite technical skill may not be available.

The principles of the invention are equally applicable to probes such as thermocouples, leads for transducers, resistance-type temperature-measuring devices and the like. Moreover, one of the central conductors may be rigid and the other flexible provided the latter is of a sufficiently smaller diameter than the former to allow a male and female fit in a manner to appear.

Other objects and advantages of the invention will become evident from the following description which, taken with the drawings, discloses certain modes of carrying the principles of the invention into practice.

In these drawings:

FIG. 1 is a combined side elevation and cross section of the two components prior to assembly;

FIG. 2 is a similar view showing these parts in assembled relation;

FIG. 3 is a side elevation, on a reduced scale, to illustrate integration of the connected parts by swaging;

FIG. 4 is a side elevation to show integration of the parts by one form of crimping;

FIGS. 5 and 5a illustrate an alternative form of crimping;

FIG. 6 is a view smilar to FIG. 2 but with a dielectric washer introduced at the end of the male component;

FIG. 7 is a view similar to FIG. 2, but with foil intermediate the two sheaths;

FIG. 8 is a modification illustrating a connection which includes a plurality of central conductors;

Figure 9:
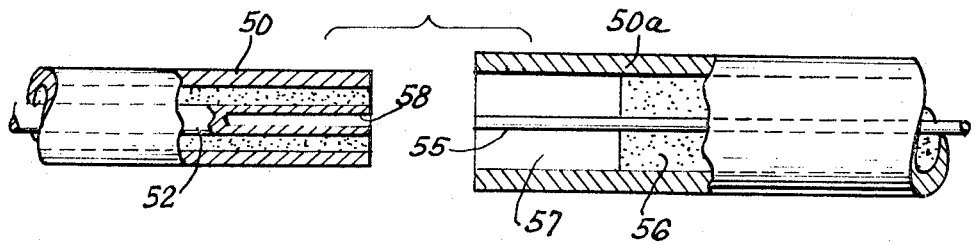
FIG. 9 is similar to FIG. 1 wherein the female central conductor is associated with the male sheath.

Regarded in a broad sense, the invention comprises a junction between two components each of which is in the nature of a coaxial conductor, viz. consisting of an electrically conductive element centrally located within a tubular metallic sheath together with a dielectric material therebetween. The center conductor of one component is tubular or has a bore at one end to receive the central conductor of the other component. This latter may be flexible. The central conductor and dielectric of the first component are terminated short of the end of the sheath to provide a pocket to receive an end portion of the other component, the two sheaths having a snug, telescoping fit. The central conductor of the other component is allowed to extend beyond the sheath thereof in order that, when the two components are telescoped such conductor may intromit the central conductor of the first component. Following this step of assembly the parts are permanently united by swaging or crimping. To improve reliability it is within contemplation to introduce an electrically-insulating washer between the end of the male sheath and the cut-back dielectric and central conductor of the companion conductor. Further, to improve hermetic sealing a layer of foil of a soft metal may be introduced between the adjacent wall surfaces of the sheaths. In another aspect the principles of the inevntion are utilizable where two coaxial components are conveniently to be joined through the intermediacy of a third member.

It is to be understood that where, in the description and claims, we refer to a center conductor the same is intended to embrace the case of a plurality of such conductors.

Reverting to the drawings, FIG. 1 illustrates two components 10 and 11 to be connetced. Component 10 comprises a conductor 13 located within a metallic sheath 14, there being a suitable electrically-insulating material 16, e.g. a refractory such as compacted magnesium oxide, therebetween. In general the elements 13, 14 and 16 will be manufactured in some convenient coterminous length, whereafter the end to be connetced is bored out as to provide a recess 18 having an end wall 19. The mating component 11 is of the same general construction as the component 10 except that the conductor 20 is allowed to protrude beyond the end face 21 by some predetermined distance. The sheath 14a of the component 11 is designed to be a reasonably snug fit within the sheath 14. The conductor 13 is drilled to provide a bore 25 to receive the conductor 20 with a reasonably snug fit or, what amounts to the same thing, the bore of the conductor 13 may be predetermined and the diameter of the conductor 20 selected to suit. Alternatively the female of the pair may be tubing. Similarly the male may be a reduced end portion of some specified basic diameter of conductor.

At this juncture it is deemed essential to a fuller understanding of the invention to point out the dimensions of componens of a typical size to which the invention has been adapted, thus:

A=0.1885"      D=0.025"
B=0.1325"      E=0.1255"
C=0.079"       F=0.022"

Dimensions of this order are aptly described as sub-miniature. It will be noted that dimension E is a slip fit in dimension B and that dimension F is a slip fit in dimension D.

Following preparation of the confronting ends of the components in the manner described, the two may be engaged as in FIG. 2 with the faces 19 and 21 in abutment. The depth of the bore 25 in relation to the protrusion 20 is desirably so selected that bottoming is avoided.

After assembly various expedients may be availed of to unify the connection. In FIG. 3 a conventional swaging operation has been performed over the length X. In this process the diameters B and E will be reduced to some extent to result in reliable frictional engagement of the two sheaths. Those in this art will recognize that some minor reduction of the diameters C, D and F will occur along with further compaction of the dielectric 16 and 16a, the crimping force being transmitted through the dielectric. See FIG. 11 for the comparable result of such crimping in a modified form of assembly to be described hereinafter. The reduction in diameter D will result in tight union of the bore 25 with the conductor 20. Thus, efficient electrical contact is obtained between the two conductors, namely the pair of sheaths and those centrally thereof. In general the sheaths may be "ground" and the central conductors the "plus."

FIG. 4 illustrates an alternative mode of securing the connection in which circumferential crimping, as at 31, is utilized. It will be obvious that, with appropriate pressure applied to the crimping rolls, the crimp will be effective through the wall of the bore 25 and, in turn, on the conductor 20.

In FIGS. 5 and 5a a flat crimp 32 is shown. The end result and advantages will be essentially the same as explained in connection with FIG. 4.

In order to ascertan the mechanical strength in straight tension and torsion a connection in accordance with the example of FIGS. 3, 4 and 5, wherein the degree of overlap of the two sheaths was ½", was clamped at its larger diameter in a vise. The smaller sheath was held in a chuck. Adjacent scribe marks were scratched on each sheath. Upon rotating the chuck three full turns the smaller sheath twisted, while the larger sheath evidenced on twist. However, there was no dislocation of one sheath from the other. A simple tension test at 100 pounds revealed no separation. Subsequent checks of conformity to a previously measured IR drop in the connection showed no change.

Assemblies to which roll crimping was imparted revealed some thinning of the wall of the outer sheath. Accordingly it was determined that a crimp of this nature should not be deeper than the wall thickness of the sheath, and that the diametral clearance between the telescoped sheaths should be no greater than one-half the wall thickness of the outer sheath. Further, care should be taken that the crimp or crimps be located essentially centrally of the overlap between the two sheaths.

Since the crimping expedient has been found to provide connections meeting the most stringent requirements, the connection can be made up in the field using simple hand tools. Even though the swaged form of splice has been found to yield superior characteristics it must be fabricated at the factory.

It may occur that the diameters C and G will vary from one another by an amount so small as to allow their confronting faces to be adjacent and thus invite short-circuiting to the sheath, especially when subjected to the swaging or crimping operation. To forestall such contingency an insulating washer 35, preferably of ceramic material (FIG. 6) may be interposed. The thickness and diameter are selected to preclude such degree of compaction or fracture as may reduce its effectiveness when swaging or crimping is performed, and to provide adequate dielectric strength at the working voltage.

It may be desirable to implement the hermetic seal between the two sheaths. FIG. 7 shows a sleeve 38 of malleable material e.g. aluminum foil, of about 0.005" thickness, interposed in the zone of overlap of the two sheaths.

The invention is not to be understood as limited to a single conductor co-axial with the sheath since the same is fully applicable to a plurality. FIG. 8 illustrates a pair of conductors enclosed in a common sheath.

Figure 10:
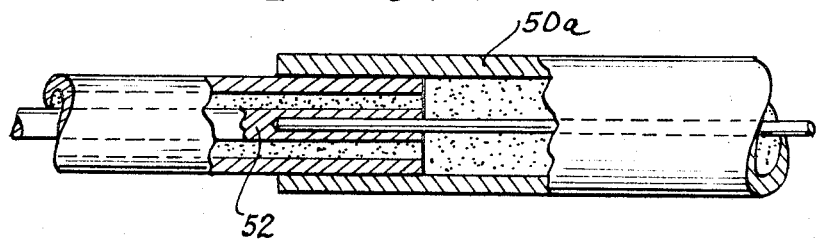
FIG. 10 shows the components of FIG. 9 as assembled.
Figure 11:
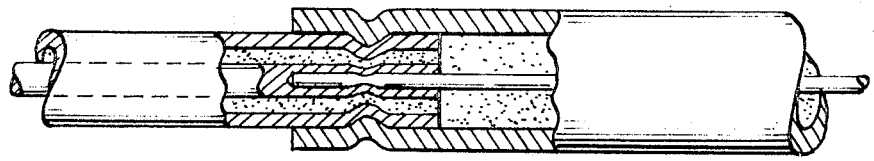
FIG. 11 shows the components of FIG. 10 following crimping.

FIGS. 9, 10 and 11 illustrate an embodiment wherein the danger of short-circuiting mentioned above is obviated. In this case the male sheath 50 is associated with the female center conductor 52 and the female sheath 50a is associated with the male center conductor 55. In this case it will be seen that the sheath 50 and conductor 52 are coterminous and that the dielectric 56 is terminated short of the end of the sheath 50a to define a recess 57 for reception of the mating component. Although the conductor 55 is shown as coterminous with the end of the sheath 50a this is not critical just as long as the same enters the bore 58 a sufficient amount to be within the zone of crimping (FIG. 11). For similar reasons the end of the conductor 52 need not be coterminous with the end of its associated sheath. It will be apparent from FIG. 10 that, when assembled, there is no hazard of the conductor 52 touching the sheath 50a.

The interpretation of FIGS. 10 and 11 is believed to be clear from the description given above with respect to FIGS. 2 and 4.

From the preceding it will have become apparent that the connecting means of the invention requires no heat, such as welding, brazing or soldering, thus insuring not only that the components are not degraded by such treatment but enabling assembly in an explosive environment, and that the joint is hermetically sealed to avoid change in an established resistance through the connection. The joint is homogeneous, i.e. consists of no elements other than the components being joined.

It is within the scope of the invention to employ tubing for the conductors 13 or 52 whereby the problems attendant upon drilling a small hole axially of a small wire be obviated.

Further, it will be clear that the basic male and female structure may be embodied at each end of a separate splicing section. In this way two components as described, may be plugged into respective ends of the splicing section, and the two joints completed by swaging or crimping in the manner described.

Of importance also is the avoidance of materials subject to degradation in the presence of temperatures up to 2000° F. or in the cryogenic range, or nuclear radiation. For example, the connection requires no potting or heat sinks.

We claim:
1. In combination, a pair of joined sub-miniature co-axial components, each component being of indefinite length and comprising a smooth tubular solid sheath, a smooth rod-like electrical conductor located therein and a dielectric interposed between the sheath and conductor, one of said sheaths being a telescoping fit with the other, one of said conductors having a longitudinal bore, a portion of the other conductor being received in said bore and making direct electrical contact with the wall of said bore, and the outer sheath having a deformation in the region of said telescoping fit securing said two sheaths and said two conductors in tight relation precluding separation by torsional and axially-applied forces of a magnitude encountered in the environment of the combination.

2. The combination in accordance with claim 1 further characterized by a dielectric disc interposed between the end of the inner one of the sheaths and the confronting end of the conductor associated with the other sheath.

3. The combination in accordance with claim 1, wherein said deformation is characterized by means providing crimped engagement between said conductors and between said sheaths.

4. The combination in accordance with claim 1 further characterized by a sleeve of readily-compressible material interposed between the sheaths in the area of the overlap thereof.

5. The combination in accordance with claim 1, wherein said dielectric in the component corresponding to the other of said sheaths terminates short of the end of said other sheath.

6. The combination in accordance with claim 5, wherein said conductor in the component corresponding to the other of said sheaths protrudes beyond the end of said dielectric.

7. The combination as recited in claim 5, wherein said conductor in the component corresponding to said other sheath terminates short of the end of said other sheath and wherein said conductor in the component corresponding to said one of said sheaths extends beyond the end of said one sheath.

References Cited
UNITED STATES PATENTS

| | | | |
|---|---|---|---|
| 2,904,619 | 9/1959 | Forney | 174—88.2 |
| 3,146,299 | 8/1964 | Norton | 174—88 |

FOREIGN PATENTS

| | | |
|---|---|---|
| 461,239 | 2/1937 | Great Britain. |

DARRELL L. CLAY, Primary Examiner

U.S. Cl. X.R.
29—628; 174—84